United States Patent [19]

Bühler

[11] Patent Number: 5,279,621
[45] Date of Patent: Jan. 18, 1994

[54] HIGH TEMPERATURE DYEING OF POLYESTER AND POLYESTER-CONTAINING TEXTILE MATERIALS UNDER ALKALINE CONDITIONS

[75] Inventor: Ulrich Bühler, Alzenau, Fed. Rep. of Germany

[73] Assignee: Cassella AG, Frankfurt, Fed. Rep. of Germany

[21] Appl. No.: 836,502

[22] Filed: Feb. 18, 1992

[30] Foreign Application Priority Data

Feb. 28, 1991 [DE] Fed. Rep. of Germany ....... 4106323

[51] Int. Cl.$^5$ .................. C09B 29/08; D06P 3/54; D06P 3/82; D06P 3/85
[52] U.S. Cl. .......................... 8/475; 8/532; 8/533; 8/537; 8/662; 8/922
[58] Field of Search ............... 8/662, 537, 475, 532

[56] References Cited

U.S. PATENT DOCUMENTS

| | | | |
|---|---|---|---|
| 4,582,509 | 4/1986 | Buhler et al. | 8/532 |
| 4,950,305 | 8/1990 | Buhler et al. | 8/639 |
| 5,019,133 | 5/1991 | Himeno et al. | 8/531 |

FOREIGN PATENT DOCUMENTS

| | | |
|---|---|---|
| 25903 | 4/1981 | European Pat. Off. . |
| 499090 | 8/1992 | European Pat. Off. . |
| 3404130 | 8/1985 | Fed. Rep. of Germany . |
| 2030167 | 4/1980 | United Kingdom . |
| 2226051 | 6/1990 | United Kingdom . |

*Primary Examiner*—A. Lionel Clingman
*Attorney, Agent, or Firm*—Connolly and Hutz

[57] ABSTRACT

The present invention relates to a process for the HT dyeing of polyester or polyester-containing textile materials at pH 8 to pH 11, characterized in that one or more monoazo dyes are used of the general formula I

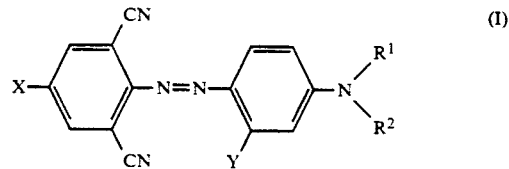

wherein
X, Y, $R^1$ and $R^2$ are each as defined in Claim 1.

19 Claims, No Drawings

HIGH TEMPERATURE DYEING OF POLYESTER AND POLYESTER-CONTAINING TEXTILE MATERIALS UNDER ALKALINE CONDITIONS

The present invention relates to a process for the HT dyeing of polyester or polyester-containing textile materials.

In general, the HT dyeing of polyester or polyester-containing textile materials with disperse dyes from an aqueous dyebath within the temperature range from 120° to 140° C. is carried out at a pH of 4 to 6, since a higher pH would destroy all or some of the disperse dye; colour strength is lost and shifts in hue occur, and the dyeings are not reproducible. Normally, then, polyester fibre, in a separate operation prior to dyeing, is subjected to an alkaline rinse treatment in order to remove auxiliaries which are used in weaving or spinning the fibres. These auxiliaries are for example oiling or sizing agents, the presence of which would make level dyeing of the polyester fibre difficult or impossible. The alkaline treatment is also carried out in order that oligomers on the polyester fibre, which have emerged from the inside of the fibre in the course of the dyeing process and make the dyeing appear unlevel, may be destroyed and kept in the aqueous dyeing liquor.

This alkaline rinse treatment is advantageously carried out at elevated temperature. To save time and energy and in order to reduce the number of machines required for the two processes, alkaline pretreatment and dyeing, it has always been an objective to combine the two processes in a single-bath rinsing and dyeing process. However, to achieve this objective it is necessary to develop processes which give reproducible dyeings in an aqueous dyebath at pH 8 to pH 11.

Polyester-cellulose and polyester-polyamide blend fabrics are in general dyed with disperse and reactive dyes respectively from an aqueous dyebath in two dyeing operations. As mentioned above, the disperse dyes are applied to the polyester portion at pH 4 to 6, while the reactive dyes are applied to the cellulose or polyamide portion at a pH between pH 11 and 13. Again it has been a past objective to develop a single-bath application process for the two dye classes. To this end, a search has been on for reactive dyes which dye even at a pH between 8 and 11, and here too it was necessary to have processes which ensure that under these conditions the polyester portion can be reproducibly dyed with disperse dyes.

To remedy the defects of prior art processes, German Offenlegungsschrift 3,938,631 describes a method whereby disperse dyes are dyed at a pH between pH 8 and 10 in the presence of at least one, optionally nitrogen-substituted amino acid and/or an alkali metal salt of an optionally nitrogen-substituted amino acid.

It has now been found, surprisingly, that it is possible to obtain reproducible dyeings at pH values between 8 and 11 even without the amino acid and amino acid derivative dyeing assistants described in German Offenlegungsschrift 3,938,631 if dyes of the general formula I are used. This is surprising because disperse dyes having a cyano group and especially those having two cyano groups in the molecule are in general pH-sensitive, since these cyano groups may become hydrolysed under alkaline conditions, causing a shift in hue and lessening of the colour strength.

The invention accordingly provides a process for the HT dyeing of polyester or polyester-containing textile materials at pH 8 to pH 11, characterised in that one or more monoazo dyes are used of the general formula I

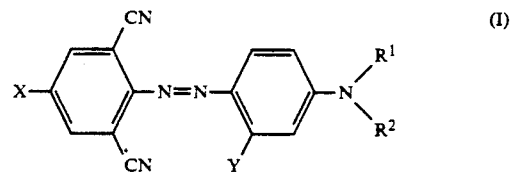

where

X is alkyl of 1 to 6 carbon atoms, cyclopentyl, cyclohexyl, alkoxy of 1 to 4 carbon atoms, hydrogen, fluorine, chlorine, bromine or trifluoromethyl, Y is hydrogen, methyl, alkoxy of 1 to 4 carbon atoms, chlorine or alkylcarbonylamino having 1 to 5 carbon atoms in the unsubstituted or $C_1$–$C_4$-alkoxy-substituted alkyl group, $R^1$ is hydrogen, linear or primary branched alkyl of 1 to 6 carbon atoms, allyl, cyanoethyl or 3-cyanopropyl, and $R^2$ is linear or primary branched alkyl of 1 to 6 carbon atoms, allyl, cyclopentyl, cyclohexyl or secondary alkyl of 3 to 6 carbon atoms.

Alkyl radicals of 1 to 6 carbon atoms are for example methyl, ethyl, n-propyl, isopropyl, n-butyl, isobutyl, sec-butyl, tert-butyl, n-pentyl, 2-pentyl, 3-pentyl, isopentyl and n-hexyl. Alkoxy radicals of 1 to 4 carbon atoms are for example methoxy, ethoxy, n-propoxy, isopropoxy, n-butoxy, isobutoxy and tertbutoxy.

A preferred process according to the invention is a process where there is or are used one or more monoazo dyes of the general formula I where X is alkyl of 1 to 6 carbon atoms, cyclopentyl, cyclohexyl, alkoxy of 1 to 4 carbon atoms, hydrogen, fluorine, chlorine, bromine or trifluoromethyl, Y is hydrogen, methyl, alkoxy of 1 to 4 carbon atoms or chlorine, $R^1$ is linear or branched primary alkyl of 1 to 6 carbon atoms, allyl, cyanoethyl or 3-cyanopropyl, and $R^2$ is linear or branched primary alkyl of 1 to 6 carbon atoms or allyl.

Particularly preferably,

X is ethyl, methoxy, ethoxy and in particular methyl, chlorine or bromine,

Y is hydrogen, methyl or methoxy, $R^1$ and $R^2$ are, independently of each other, linear alkyl of 1 to 6 carbon atoms, the sum total of the carbon atoms in $R^1$ and $R^2$ being not less than 3, and in particular linear alkyl of 2 to 4 carbon atoms or allyl.

A further process according to the invention is a process where there is or are used one or more monoazo dyes of the general formula I where X is alkyl of 1 to 6 carbon atoms, cyclopentyl, cyclohexyl, alkoxy of 1 to 4 carbon atoms, hydrogen, fluorine, chlorine, bromine or trifluoromethyl, Y is alkylcarbonylamino having 1 to 5 carbon atoms in the unsubstituted or $C_1$–$C_4$-alkoxy-substituted alkyl group, $R^1$ is hydrogen and $R^2$ is secondary alkyl of 3 to 6 carbon atoms, cyclopentyl or cyclohexyl, or $R^1$ is cyanoethyl or 3-cyanopropyl and $R^2$ is linear or branched primary alkyl of 1 to 6 carbon atoms or allyl.

Particularly preferably,

X is ethyl, methoxy, ethoxy and in particular methyl, chlorine or bromine,

Y is alkylcarbonylamino having 1 to 5 carbon atoms and in particular
2 to 4 carbon atoms in the alkyl group,
$R^1$ is hydrogen and
$R^2$ is secondary alkyl of 3 to 6 and in particular 4 to 5 carbon atoms.

Preferred radicals $R^1$ other than hydrogen are linear alkyl of 1 to 6 carbon atoms and allyl.

The dyes of the general formula I are known and described for example in DE-A 2935011, DE-A 3404130, DE-A 3405021, DE-A 2937329, DE-A 3404130 and DE-A 3831356.

The HT process according to the invention is preferably carried out in a dyeing autoclave.

The polyesters to be dyed by the process according to the invention are in particular those based on polyethylene glycol terephthalates. Polyester-containing textile materials are blends of polyester and polyamides, in particular polyaster/cellulose blend fabrics.

The process according to the invention is carried out with the dyes or dye mixtures in a state of fine division. The dyes are finely divided in a conventional manner by suspending the as-synthesised dye in a liquid medium, preferably water, together with dispersants and subjecting the mixture to the action of shearing forces, which mechanically comminutes the dye particles originally present to such an extent as to produce an optimum specific surface area and keep dye sedimentation to a minimum. The particle sizes of the dyes are in general between 0.5 and 5 μm, preferably about 1 μm.

The dispersants used in the grinding process can be nonionic or anionic. Nonionic dispersants are for example reaction products of alkylene oxides, e.g. ethylene oxide or propylene oxide, with alkylatable compounds, for example fatty alcohols, fatty amines, fatty acids, phenols, alkylphenols and carboxamides. Anionic dispersants are for example ligninsulphonates, alkyl- or alkylarylsulphonates or alkyl-aryl-polyglycol ether sulphonates.

The dye preparations thus obtained should be pourable for most application methods. The dye and dispersant content is therefore limited in these cases. In general, the dispersions are adjusted to a dye content of up to 50% by weight and a dispersant content of up to about 25%. For economic reasons, the dye content is usually not less than 15% by weight.

The dispersions may contain further auxiliaries, for example those which act as oxidising agents, such as sodium m-nitrobenzenesulphonate, or fungicides, e.g. sodium o-phenylphenolate and sodium pentachlorophenolate.

For certain applications it is preferable to have pulverulent formulations. These powders contain the dye or the dye mixture, dispersants and other auxiliaries, for example wetting, oxidising, preserving and dustproofing agents.

A preferred method for preparing pulverulent dye preparations consists in stripping the above-described liquid dye dispersions of the liquid, for example by vacuum drying, freeze drying, drying on drum dryers, but preferably by spray drying.

To prepare dyeing liquors, the necessary amounts of dye formulations prepared as described above are diluted with the dyeing medium, preferably water, to such an extent as to produce for the dyeing a liquor ratio of from 5:1 to 50:1. The liquors are in general additionally admixed with further dyeing auxiliaries, such as dispersing, wetting and fixing auxiliaries.

The necessary dyeing liquor pH is set before or else during the dyeing by addition of bases such as alkali metal hydroxides, e.g. aqueous sodium hydroxide solution, alkali metal bicarbonates, e.g. sodium bicarbonate, or alkali metal carbonates, e.g. sodium carbonate. A preferred pH is pH 9 to 10.

To minimise pH fluctuations, it is preferable to add buffer substances as described for example in JSDC, 77 (1979), p. 47, or JSDC 79 (1981), p. 115. Particularly suitable buffer substances are those which have the greatest buffering effect in the pH range between 9 and 11. Suitable buffer systems are for example acetic acid/sodium pyrophosphate, boric acid/borax, sodium dihydrogenphosphate/disodium hydrogenphosphate, phosphoric acid/succinic acid/boric acid or combinations of organic phosphorus compounds with polycarboxylic acids. The amount of buffer system used is in general between 0.5 and 10 g/l.

The inventive concept will now be more particularly illustrated by reference to examples.

EXAMPLE 1

1.5 g of a 20% strength powder preparation of the dye of the formula II

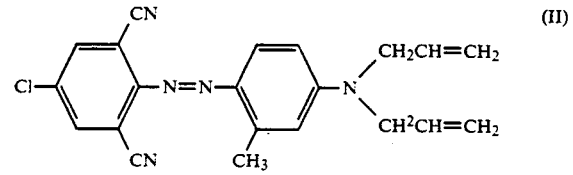

are applied in a dyeing autoclave in a dyeing liquor consisting of 2 l of water, 2 g of a dyeing auxiliary based on a formaldehyde condensation product and 5 g of a buffer substance comprising a mixture of an organic phosphorus compound and a polycarboxylic acid to 100 g of polyethylene terephthalate fabric at 130° C. in the course of 45 min after the pH of the dyeing liquor has been adjusted to 9.5 with aqueous sodium hydroxide solution. Then the dyeing is rinsed, reduction cleared, rinsed again, and dried. This produces a bluish red dyeing in a bright shade. The dyeing is repeated, except that the buffer substance used is 4 g of sodium acetate and the pH of the dyeing liquor is adjusted to 4:5 with acetic acid. The resulting dyeing serves as a reference material for a colorimetric comparison with the pH 9.5 dyeing. On this basis the colorimetric values of the pH 9.5 dyeing are: colour strength: 99.9%, ΔH -0.05, ΔC -0.81; that is, the two dyeings are virtually identical in hue and there has been virtually no decomposition of the dye at pH 9.5.

EXAMPLE 2

Replacing the dye of the formula II in Example 1 with 4 g of a 10% strength liquid preparation of the dye of the formula III

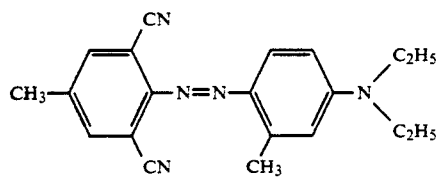

(III)

buffering the dyeing liquor with a mixture of 3.6 ml of phosphoric acid, 4 g of succinic acid and 4 g of boric acid, and adjusting the dyeing liquor pH to 9 likewise results in a bright bluish red dyeing. Compared with a dyeing carried out at pH 4.5 it has the following colorimetric values:

colour strength: 101.5%, ΔH: −0.15, ΔC: 0.26.
Again, there has been virtually no decomposition of the dye at the elevated pH.

EXAMPLE 3

Replacing the dye of the formula II in Example 1 with 3 g of a 10% strength liquid preparation of the dye of the formula IV

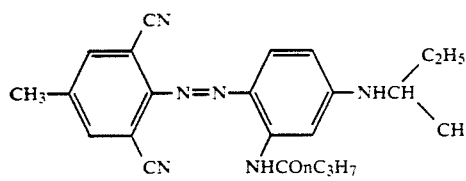

(IV)

and dyeing at pH 10 gives a bright bluish red dyeing which, compared with the dyeing obtained at pH 4.5, has the following colorimetric values:

colour strength: 101.9%, ΔH: 0.47, ΔC: −0.06 and is thus likewise identical in hue.

The tables which follow give further dyes which can be used in the processes according to the invention.

The tables use the following abbreviations:

| yellowish red: | 1 | red: | 2 |
| bluish red: | 3 | reddish violet: | 4 |
| violet: | 5 | scarlet: | 6 |

TABLE 1

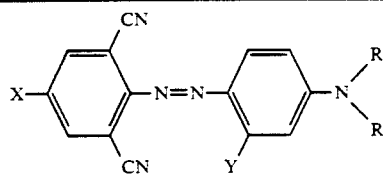

(I)

| X | Y | $R^1$ | $R^2$ | Hue on polyester |
|---|---|---|---|---|
| $CH_3$ | H | $C_2H_5$ | $C_2H_5$ | 2 |
| $CH_3$ | H | $C_2H_5$ | $CH_2CH=CH_2$ | 2 |
| $CH_3$ | H | $CH_3$ | $nC_4H_9$ | 2 |
| $CH_3$ | H | $C_2H_5$ | $CH_2CH(CH_3)_2$ | 2 |
| $CH_3$ | $CH_3$ | $nC_3H_7$ | $nC_3H_7$ | 2 |
| $CH_3$ | $CH_3$ | H | $CH(C_2H_5)CH_3$ | 1 |

TABLE 1-continued

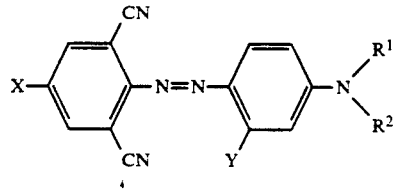

(I)

| X | Y | $R^1$ | $R^2$ | Hue on polyester |
|---|---|---|---|---|
| $CH_3$ | $CH_3$ | $CH_2CH=CH_2$ | $CH_2CH=CH_3$ | |
| $CH_3$ | $OCH_3$ | $C_2H_5$ | $C_2H_5$ | 2 |
| $CH_3$ | $OnC_3H_7$ | $nC_3H_7$ | $nC_3H_7$ | 2 |
| $CH_3$ | Cl | $nC_3H_7$ | $CH_2CH=CH_2$ | 1 |
| $C_2H_5$ | H | $C_2H_5$ | $C_2H_5$ | 2 |
| $C_2H_5$ | H | $CH_3$ | $nC_6H_{13}$ | 2 |
| $C_2H_5$ | $CH_3$ | $C_2H_5$ | $C_2H_5$ | 2 |
| $nC_3H_7$ | H | $C_2H_5$ | $C_2H_5$ | 2 |
| $iC_3H_7$ | $CH_3$ | $C_2H_5$ | $C_2H_5$ | 2 |
| $CycloC_6H_{11}$ | H | $CH_2CH=CH_2$ | $CH_2CH=CH_2$ | 2 |
| $OCH_3$ | H | $nC_4H_9$ | $nC_4H_9$ | 2 |
| $OCH_3$ | $CH_3$ | $C_2H_5$ | $nC_3H_7$ | 2 |
| $OCH_3$ | $OCH_3$ | $CH_3$ | $nC_5H_{11}$ | 2 |
| $OC_2H_5$ | $CH_3$ | H | $CH(C_2H_5)_2$ | 1 |
| F | $CH_3$ | $C_2H_5$ | $C_2H_5$ | 2 |
| F | $CH_3$ | $C_2H_5$ | $CH_2CH=CH_2$ | 2 |
| F | H | $C_2H_5$ | $nC_4H_9$ | 2 |
| F | $OCH_3$ | $CH_2CH=CH_2$ | $CH_2CH=CH_2$ | 2 |
| Cl | H | $CH_2CH=CH_2$ | $CH_2CH=CH_2$ | 2 |
| Cl | H | $C_2H_5$ | $CH_2CH=CH_2$ | 2 |
| Cl | H | $CH_3$ | $CH_2CH(C_2H_5)_2$ | 2 |
| Cl | H | $nC_4H_9$ | $nC_4H_9$ | 2 |
| Cl | H | $nC_6H_{13}$ | $nC_6H_{13}$ | 2 |
| Cl | $CH_3$ | $C_2H_5$ | $C_2H_5$ | 3 |
| Cl | $CH_3$ | $C_2H_5$ | $CH_2CH=CH_2$ | 3 |
| Cl | $CH_3$ | $nC_3H_7$ | $nC_3H_7$ | 3 |
| Cl | $OCH_3$ | $C_2H_5$ | $C_2H_5$ | 2 |
| Cl | $OnC_4H_9$ | $CH_3$ | $NC_4H_9$ | 2 |
| Br | H | $CH_2CH=CH_2$ | $CH_2CH=CH_2$ | 2 |
| Br | H | $C_2H_5$ | $C_2H_5$ | 2 |
| Br | H | $nC_3H_7$ | $nC_3H_7$ | 2 |
| Br | H | $C_2H_5$ | $nC_4H_9$ | 2 |
| Br | $CH_3$ | $CH_2CH=CH_2$ | $CH_2CH=CH_2$ | 3 |
| Br | $CH_3$ | $CH_2CH=CH_2$ | $nC_3H_7$ | 3 |
| Br | $CH_3$ | $CH_3$ | $nC_3H_7$ | 3 |
| Br | $CH_3$ | $C_2H_5$ | $C_2H_5$ | 3 |
| Br | $OCH_3$ | $CH_3$ | $CH_3$ | 2 |
| Br | $OCH_3$ | $CH_2CH=CH_2$ | $CH_2CH=CH_2$ | 2 |
| Br | Cl | $nC_3H_7$ | $nC_3H_7$ | 2 |
| $CF_3$ | $CH_3$ | $nC_4H_9$ | $nC_4H_9$ | 2 |
| Cl | $CH_3$ | H | $CH(C_2H_5)_2$ | 2 |
| Br | H | H | $CycloC_5H_9$ | 2 |
| $CH_3$ | $CH_3$ | $(CH_2)_2CN$ | $C_2H_5$ | 1 |
| $CH_3$ | $CH_3$ | $(CH_2)_2CN$ | $CH_2CH=CH_2$ | 1 |
| $CH_3$ | $CH_3$ | $(CH_2)_3CN$ | $C_2H_5$ | 1 |
| $CH_3$ | $CH_3$ | $(CH_2)_2CN$ | $nC_4H_9$ | 1 |
| $C_2H_5$ | $CH_3$ | $(CH_2)_2CN$ | $nC_3H_7$ | 1 |
| $CH_3$ | H | $(CH_2)_2CN$ | $nC_4H_9$ | 6 |
| F | $CH_3$ | $(CH_2)_2CN$ | $CH_2CH(CH_3)_2$ | 1 |
| Cl | $CH_3$ | $(CH_2)_3CN$ | $CH_2CH=CH_2$ | 2 |
| Cl | $CH_3$ | $(CH_2)_2CN$ | $nC_6H_{13}$ | 2 |
| Cl | $CH_3$ | $(CH_2)_3CN$ | $nC_3H_7$ | 2 |
| Br | $CH_3$ | $(CH_2)_3CN$ | $CH_3$ | 2 |
| Cl | H | $(CH_2)_2CN$ | $nC_4H_9$ | 1 |
| Cl | H | $(CH_2)_2CN$ | $iC_3H_7$ | 1 |
| Br | H | $(CH_2)_3CN$ | $nC_4H_9$ | 1 |
| $OCH_3$ | $CH_3$ | $(CH_2)_2CN$ | $C_2H_5$ | 1 |
| Cl | $OCH_3$ | $(CH_2)_2CN$ | $CH_2CH=CH_2$ | 1 |
| Br | $OCH_3$ | $(CH_2)_2CN$ | $nC_3H_7$ | 1 |
| $CH_3$ | Cl | $(CH_2)_3CN$ | $C_2H_5$ | 6 |
| Cl | Cl | $(CH_2)_2CN$ | $nC_4H_9$ | 6 |

TABLE 2

Structure: X-substituted benzene ring with CN groups at 2,6-positions, azo-linked to phenyl with NHCOR and NR¹R² substituents.

| X | Y | R¹ | R² | Hue on polyester |
|---|---|---|---|---|
| $CH_3$ | $C_2H_5$ | H | $CH(CH_3)C_2H_5$ | 3 |
| $CH_3$ | $iC_3H_7$ | H | $CH(CH_3)C_2H_5$ | 3 |
| $CH_3$ | $C_2H_5$ | H | $CH(CH_3)_2$ | 3 |
| $CH_3$ | $iC_3H_7$ | H | $CH(C_2H_5)_2$ | 3 |
| $CH_3$ | $C_2H_5$ | H | $CH_2CH(CH_3)_2$ | 3 |
| $CH_3$ | $nC_3H_7$ | H | $CycloC_6H_{11}$ | 3 |
| $CH_3$ | $nC_4H_9$ | H | $CH(C_2H_5)_2$ | 3 |
| $C_2H_5$ | $CH_3$ | H | $CH(CH_3)C_2H_5$ | 3 |
| $C_2H_5$ | $C_2H_5$ | H | $CH(CH_3)_2$ | 3 |
| $C_2H_5$ | $nC_3H_7$ | H | $CH(C_2H_5)nC_3H_7$ | 3 |
| $C_2H_5$ | $nC_3H_7$ | H | $CH(CH_3)C_2H_5$ | 3 |
| $nC_3H_7$ | $C_2H_5$ | H | $CH(CH_3)C_2H_5$ | 3 |
| $iC_3H_7$ | $iC_3H_7$ | H | $CH(C_2H_5)_2$ | 3 |
| $CycloC_6H_{11}$ | $CH_3$ | H | $CH(CH_3)C_2H_5$ | 3 |
| $CH_3$ | $C_2H_5$ | $C_2H_5$ | $C_2H_5$ | 4 |
| $CH_3$ | $nC_3H_7$ | $CH_3$ | $(CH_2)_2CH(CH_3)$ | 4 |
| $OCH_3$ | $C_2H_5$ | H | $CH(C_2H_5)$ | 3 |
| $OCH_3$ | $nC_3H_7$ | H | $CH(CH_3)_2$ | 3 |
| $OCH_3$ | $iC_3H_7$ | H | $CH(CH_3)C_2H_5$ | 3 |
| $OC_2H_5$ | $C_2H_5$ | H | $CH_2CH(C_2H_5)_2$ | 3 |
| H | $nC_3H_7$ | H | $CH(C_2H_5)_2$ | 3 |
| F | $iC_3H_7$ | H | $CH(CH_3)C_2H_5$ | 3 |
| F | $nC_3H_7$ | H | $CH(C_2H_5)_2$ | 3 |
| Cl | $nC_3H_7$ | H | $CH(CH_3)C_2H_5$ | 4 |
| Cl | $C_2H_5$ | H | $CH(CH_3)C_2H_5$ | 4 |
| Cl | $CH_3$ | H | $CH(C_2H_5)_2$ | 4 |
| Cl | $iC_3H_7$ | H | $CH(CH_3)C_2H_5$ | 4 |
| Cl | $nC_3H_7$ | $C_2H_5$ | $C_2H_5$ | 5 |
| Cl | $nC_5H_{11}$ | H | $CH_2CH(CH_3)_2$ | 4 |
| Br | $C_2H_5$ | H | $CH(C_2H_5)_2$ | 4 |
| Br | $nC_3H_7$ | H | $CH(CH_3)C_2H_5$ | 4 |
| Br | $nC_3H_7$ | H | $CH(C_2H_5)_2$ | 4 |
| Br | $iC_3H_7$ | H | $CycloC_6H_{11}$ | 4 |
| Br | $nC_4H_9$ | H | $CH(CH_3)C_2H_5$ | 4 |
| Br | $C_2H_5$ | $CH_3$ | $CH_2CH(C_2H_5)_2$ | 4 |
| Br | $iC_4H_9$ | H | $CH(CH_3)C_2H_5$ | 4 |
| Cl | $iC_5H_9$ | H | $CH_2(CH_3)_2$ | 4 |
| $CH_3$ | $nC_4H_9$ | H | $CH(CH_3)C_2H_5$ | 3 |
| $CH_3$ | $CH_2OC_2H_5$ | H | $CH(CH_3)C_2H_5$ | 3 |
| $CH_3$ | $CH_2OC_2H_5$ | H | $CH(C_2H_5)_2$ | 3 |
| $CH_3$ | $CH_2OnC_4H_9$ | H | $CH(CH_3)_2$ | 3 |
| Cl | $CH_2OnC_3H_7$ | H | $CH(CH_3)C_2H_5$ | 4 |
| Br | $CH_2OCH_3$ | H | $CH(C_2H_5)_2$ | 4 |
| $CH_3$ | $(CH_2)_2OCH_3$ | H | $CH(C_2H_5)nC_3H_7$ | 3 |
| $CH_3$ | $(CH_2)_2OiC_3H_7$ | H | $CH(CH_3)_2$ | 3 |
| Cl | $(CH_2)_2OC_2H_5$ | H | $CH(CH_3)C_2H_5$ | 4 |
| Br | $(CH_2)_2OnC_3H_7$ | H | $CH(C_2H_5)_2$ | 4 |
| $CH_3$ | $C_2H_5$ | $(CH_2)_2CN$ | $CH_2CH=CH_2$ | 2 |
| $CH_3$ | $nC_3H_7$ | $(CH_2)_2CN$ | $CH_2CH=CH_2$ | 2 |
| $CH_3$ | $C_2H_5$ | $(CH_2)_2CN$ | $CH_2CH=CH_2$ | 2 |
| $CH_3$ | $nC_4H_9$ | $(CH_2)_2CN$ | $CH_2CH=CH_2$ | 2 |
| $CH_3$ | $C_2H_5$ | $(CH_2)_2CN$ | $C_2H_5$ | 2 |
| $CH_3$ | $nC_3H_7$ | $(CH_2)_2CN$ | $C_2H_5$ | 2 |
| $C_2H_5$ | $nC_3H_7$ | $(CH_2)_2CN$ | $CH_2CH=)CH_2$ | 2 |
| $CH_3$ | $iC_3H_7$ | $(CH_2)_2CN$ | $nC_3H_7$ | 2 |
| Cl | $C_2H_5$ | $(CH_2)_2CN$ | $C_2H_5$ | 3 |
| Cl | $nC_3H_7$ | $(CH_2)_2CN$ | $nC_4H_9$ | 3 |
| Cl | $C_2H_5$ | $(CH_2)_2CN$ | $CH_2CH=CH_2$ | 3 |
| Br | $CH_3$ | $(CH_2)_2CN$ | $nC_4H_9$ | 3 |
| Br | $nC_3H_9$ | $(CH_2)_2CN$ | $C_2H_5$ | 3 |
| Br | $iC_3H_7$ | $(CH_2)_2CN$ | $iC_3H_7$ | 3 |
| Br | $C_2H_5$ | $(CH_2)_2CN$ | $CH_2CH=CH_2$ | 3 |
| $OCH_3$ | $C_2H_5$ | $(CH_2)_2CN$ | $nC_4H_9$ | 2 |
| F | $nC_3H_7$ | $(CH_2)_2CN$ | $C_2H_5$ | 2 |

I claim:

1. Process for the HT dyeing of polyester or polyester-containing textile materials at pH 8 to pH 11, characterised in that one or more monoazo dyes are used of the general formula I

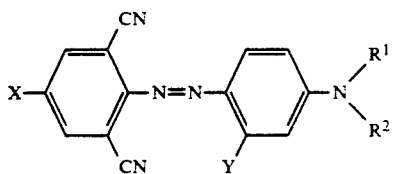

(I)

where
X is alkyl of 1 to 6 carbon atoms, cyclophenyl, cyclohexyl, alkoxy of 1 to 4 carbon atoms, hydrogen, fluorine, chlorine, bromine or trifluoromethyl, Y is hydrogen, methyl, alkoxy of 1 to 4 carbon atoms, chlorine or alkylcarbonylamino having 1 to 5 carbon atoms in the unsubstituted or $C_1$-$C_4$-alkoxy substituted alkyl group, $R^1$ is hydrogen, linear or primary branched alkyl of 1 to 6 carbon atoms, allyl, cyanoethyl or 3-cyanopropyl, and $R^2$ is linear or primary branched alkyl of 1 to 6 carbon atoms, allyl, cyclophenyl, cyclohexyl or secondary alkyl of 3 to 6 carbon atoms.

2. Process according to claim 1, characterised in that there is or are used one or more monoazo dyes of the general formula I where
X is alkyl of 1 to 6 carbon atoms, cyclophenyl, cyclohexyl, alkoxy of 1 to 4 carbon atoms, hydrogen, fluorine, chlorine, bromine or trifluoromethyl, Y is hydrogen, methyl, alkoxy of 1 to 4 carbon atoms or chlorine, $R^1$ is linear or branched primary alkyl of 1 to 6 carbon atoms, allyl, cyanoethyl or 3-cyanopropyl, and $R^2$ is linear or branched primary alkyl of 1 to 6 carbon atoms or allyl.

3. Process according to claim 2, characterised in that
X is ethyl, methoxy, ethoxy, methyl, chlorine or bromine, Y is hydrogen, methyl or methoxy $R^1$ and $R^2$ are, independently of each other, linear alkyl of 1 to 6 carbon atoms, the sum total of the carbon atoms in $R^1$ and $R^2$ being not less than 3.

4. Process according to claim 1, characterised in that one or more monoazo dyes of the general formula I where
X is alkyl of 1 to 6 carbon atoms, cyclophenyl, cyclohexyl, alkoxy of 1 to 4 carbon atoms, hydrogen, fluorine, chlorine bromine or trifluoromethyl, Y is alkylcarbonylamino having 1 to 5 carbon atoms in the unsubstituted or $C_1$-$C_4$-alkoxy-substituted alkyl group $R^1$ is hydrogen and $R^2$ is secondary alkyl of 3 to 6 carbon atoms, cyclopentyl or cyclohexyl, or $R^1$ is cyanoethyl or 3-cyanopropyl and $R^2$ is linear or branched primary alkyl of 1 to 6 carbon atoms or allyl.

5. Process according to claim 4, characterised in that
X is ethyl, methoxy, ethoxy, Y is alkylcarbonylamino having 1 to 5 carbon atoms, $R^1$ is hydrogen and $R^2$ is secondary alkyl of 3 to 6.

6. Process according to claim 1, characterised in that the dyeing is carried out at pH 9 to pH 10.

7. Process according to claim 1, characterised in that the dyeing is carried out in the presence of one or more buffer substances which have a buffering effect in the particular pH range used.

8. The process according to claim 1, wherein $R^1$ is linear alkyl of 1 to 6 carbon atoms or allyl.

9. The process according to claim 1, wherein the HT process is carried out in a dyeing autoclave.

10. The process as claimed in claim 1, wherein the polyesters to be dyed are those based on polyethylene glycol terephthalates.

11. The process according to claim 1, wherein the dyes have a particle size in general between 0.5 to 5 μm.

12. The process according to claim 1, wherein the dyes have a particle size in general about 1 μm.

13. The process as claimed in claim 1, wherein the dyes are finely divided by suspending the dye or the dye mixture in a liquid medium.

14. The process according to claim 13, wherein said liquid medium is water or water mixed with dispersants.

15. The process according to claim 13, wherein said liquid medium is water.

16. The process according to claim 14, wherein said dispersants are nonionic or anionic.

17. The process according to claim 16, wherein the nonionic dispersants are reaction product of alkylene oxides with alkylatable compounds.

18. The process according to claim 17, wherein the nonionic dispersants are reaction products of ethylene oxide or propylene oxide with fatty alcohols, fatty amines, fatty acids, phenols, alkylphenols or carboxamides.

19. The process according to claim 16, wherein the anionic dispersants are selected from the group consisting of ligninsulphonates, alkylarylsulphonates and alkyl-arylpolyglycol ether sulphonates.

* * * * *